April 8, 1930.

A. MAVROGENIS

ELECTRON DISCHARGE DEVICE

Re. 17,640

Original Filed Jan. 2, 1926

2 Sheets-Sheet 1

INVENTOR

Aristote Mavrogenis

BY

ATTORNEYS

April 8, 1930. A. MAVROGENIS Re. 17,640

ELECTRON DISCHARGE DEVICE

Original Filed Jan. 2, 1926 2 Sheets-Sheet 2

INVENTOR
Aristote Mavrogenis
BY
ATTORNEYS

Reissued Apr. 8, 1930

Re. 17,640

UNITED STATES PATENT OFFICE

ARISTOTE MAVROGENIS, OF MILWAUKEE, WISCONSIN

ELECTRON-DISCHARGE DEVICE

Original No. 1,638,499, dated August 9, 1927, Serial No. 78,876, filed January 2, 1926. Application for reissue filed June 7, 1929. Serial No. 369,252.

This invention relates to electron discharge devices.

In electron discharge devices such as those used in wireless circuits, it has been the usual practice to energize the filaments from batteries and also to furnish the plate current from batteries, or else to provide auxiliary apparatus for rectifying alternating current and stepping it either up or down to supply the plate and the filament, respectively.

This invention is designed to provide an electron discharge device which requires neither batteries nor auxiliary rectifying devices for energizing its filament and plate, but which is in itself complete, and may be directly connected to either alternating or direct current industrial supply mains without any auxiliary apparatus whatsoever, and in certain forms of the invention, without the use of transformers.

Further objects are to provide a unitary electron discharge device which is complete in itself as to rectifying alternating current, removing the pulsations from the rectified current and using such current in its audion portion for the reception of radio energy.

Further objects are to provide a device which may be employed in wireless systems and may be directly connected to alternating current mains without any danger of a disturbance from such mains in the form of an objectionable hum, and in which the filament for heating certain portions of the device is directly energized at the voltage of the industrial supply mains.

Further objects are to provide a unitary electron discharge device having the characteristics enumerated above, which may be used in a simplified wireless receiving set, and which will eliminate a large number of the usual bus bars or wires employed in the set, thereby lessening the capacity due to the wiring, and consequently lessening the distortion due to the effect of the wiring.

Further objects are to provide a novel form of electron discharge device in which a single control may be employed to govern both the temperature of the filament and the voltage impressed upon the plate of its audion part, so that the maximum ease and accuracy of adjustment may be readily attained.

Further objects are to provide a unitary electron discharge device having the characteristics noted above and yet in which the number of filament supports is materially reduced, in which a high degree of efficiency is attained, and which has a long life and a low operating cost.

Embodiments of the invention are shown in the accompanying drawings, in which:—

It is to be understood that the tubes disclosed in this case are intended for use either as amplifiers of radio or audio waves or as detectors, or in any other capacity in which the vacuum tube characteristics are desired.

Figure 1:
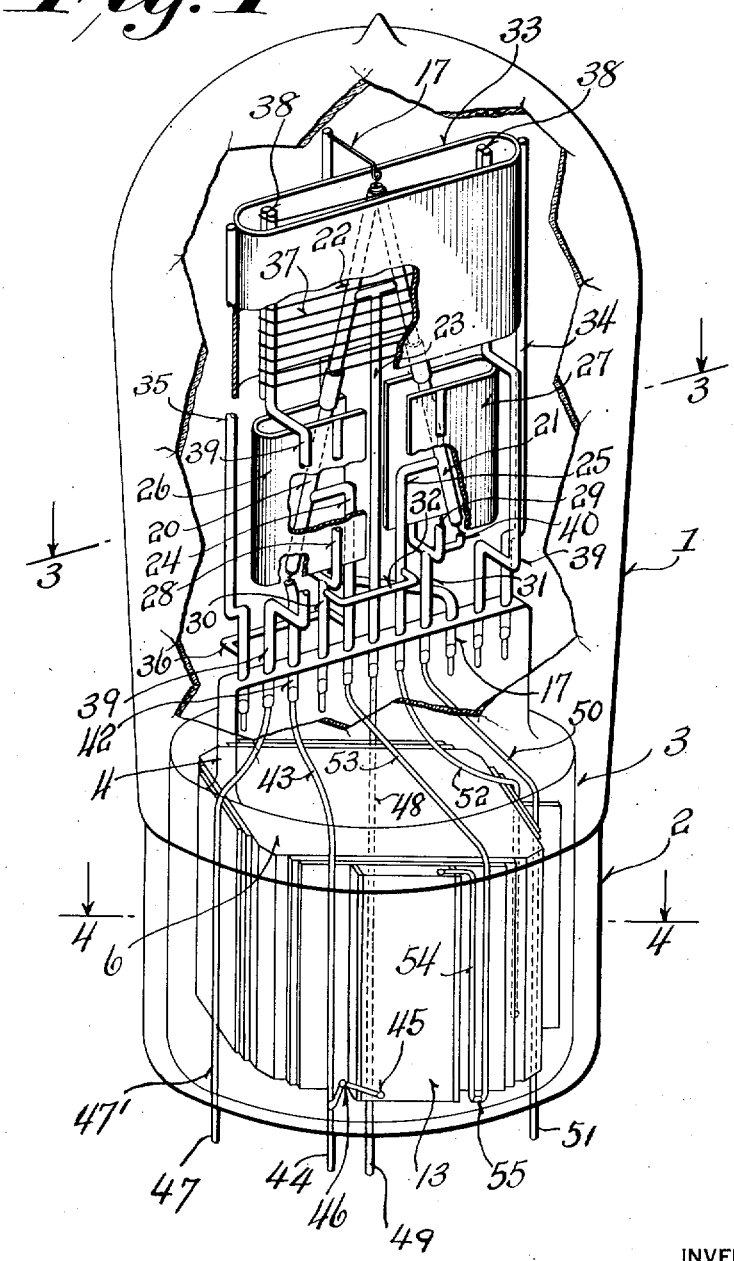
Figure 1 is a view of the tube with portions broken away for clearness.
Figure 4:
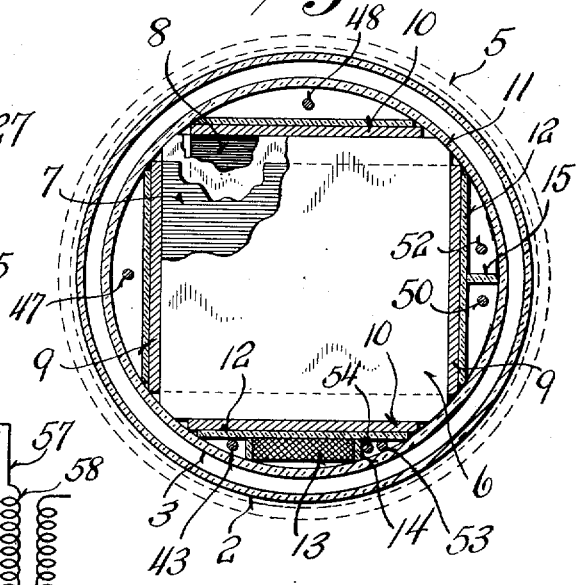
Figure 4 is a sectional view on the line 4—4 of Figure 1.

Referring first to Figures 1 and 4, it will be seen that the tube comprises a highly evacuated vessel 1 preferably of glass which continues downwardly to form an outer shank or shell 2 and then extends upwardly to form an inner shell or neck 3 closely spaced from the outer shell 2. This inner neck is closed at its upper end and carries a transverse rectangular bridge piece 4 which is formed as a unitary glass structure with the remaining portion of the tube. The neck portion 2 of the tube is suitably cemented within a base portion indicated in dotted lines at 5 in Figure 4, and preferably such base portion extends across the bottom of the tube and is apertured for the prongs of the tube in the usual manner.

The neck 3 of the tube is considerably larger in diameter than the necks of the usual type of vacuum tubes used in wireless devices. This is for the purpose of providing a space for the reception of the condenser indicated generally by the reference character 6 in Figures 1 and 4. The vessel, therefore, has two compartments: One of the compartments is the evacuated portion, and the other compartment is the space enclosed by the neck 3.

The cap or base portion 5 which encloses the bottom of the tube is cemented to the outer shell 2 in the usual manner and extends across the bottom, as stated, and thus seals the cavity within the neck 3 thereby forming a vessel or compartment within which the condenser 6 is positioned. This condenser is of rectangular construction and is preferably made up of alternate sheets of mica and metal foil, the metal foil being indicated by the characters 7 and 8 in Figure 4. These alternate sheets of metal foil have their ends folded or pressed together, as indicated respectively at 9 and 10, on opposite faces of the condenser. Preferably the edges of the condenser are beveled, as indicated at 11, to provide the maximum size of condenser capable of being received within the space provided by the neck 3. Each of these terminal portions of the condenser or compacted portions 9 and 10 are covered by sheets of mica 12, as shown in Figure 4, to prevent contact with the conductors and other portions of the apparatus which are positioned within the space between the faces of the condenser and the inner wall of the neck portion 3, as brought out in Figure 4. Further, as brought out in such figure, a high resistance carbon or other block of material 13 is positioned in one of these spaces, and its purpose will later be developed. The outer edges of this resistance are protected by narrow mica strips 14 and wherever desired or needed, additional mica strips, such as indicated at 15 in Figure 4, may be employed to guard against short circuiting or inadvertent contact of the active parts of the device.

All of the parts of the device contained within the evacuated vessel 1 are carried by the relatively heavy bridge piece 4 and their supports and terminals are sealed within this bridge piece as is apparent from an inspection of Figure 1.

Figure 2:
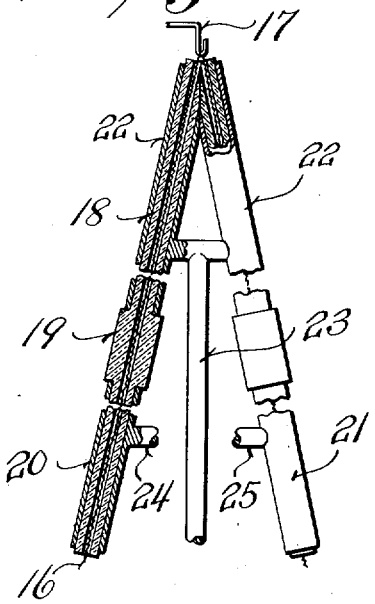
Figure 2 is an enlarged view partly in section of the cathodes of the several devices.

One filament is employed for the entire device and is of such resistance and size that it may be directly connected with the ordinary commercial supply mains, such as the alternating current mains. This filament is shown in greatest detail in Figure 2, and is indicated by the reference character 16. Preferably, this filament is a small spiral arranged in a V-shape and supported at its upper end by means of the metal member or filament support 17. This filament support 17 continues downwardly and has its terminal sealed in the bridge piece 4, as indicated in Figure 1. Each leg of the filament is positioned within a quartz or porcelain tube 18, as developed in greatest detail in Figure 2, and these quartz tubes are provided with enlargements 19 intermediate their ends. Upon the lower ends of the quartz tubes are slipped the tungsten or nickel tubes 20 and 21 and upon the upper ends of the quartz tubes 18 are slipped the metal tubes 22 which are similarly formed of tungsten, nickel or other suitable metal. All of these tubes are thin and are preferably coated with a low electron affinity oxide, such as barium, thorium, strontium, or calcium, for instance.

The tubes 22 are welded together at their contacting upper portions and are carried by a metal support and conductor 23 which is sealed in the bridge piece 4, as shown in Figure 1. The tube 20 is similarly carried by a metal conductor 24 which extends at right angles and then downwardly and is sealed in the bridge piece 4. Similarly, the tube 21 is carried by a metal support and conductor 25 which also is sealed in the bridge piece.

Thus three heated cathodes 20, 21 and 22 are provided and are simultaneously heated by means of the same filament 16. The cathodes may, therefore, be employed as equipotential cathodes or indirectly heated cathodes, in the form shown in the drawings, and although the filament 16 is adapted for energization from alternating current, nevertheless the pulsations in temperature are smoothed out through the quartz tube and the cathodes are, therefore, heated to a uniform and unvarying temperature.

The cathodes 20 and 21 are surrounded by U-shaped metal plates 26 and 27, respectively, which constitutes the plates of the current limiting device and of the rectifier, respectively. These U-shaped plates are carried by means of forked supports 28 and 29, which are equipped with downwardly extending members 30 and 31, respectively.

It is to be noted from reference to Figure 1 that the conductor 25 is joined to the conductor 30 by means of the short conductor 32, thus joining the cathods 21 of the rectifier with the plate 26 of the current limiting device.

The audion portion of the apparatus has its cathode formed by the tubes 22 which are surrounded by a plate 33 adjacent the upper portion of the apparatus. This plate is carried by supports 34 and 35, such supports being, of course, formed of metal and the support 35 being utilized as the conductor leading to the plate of the audion. This support 35 is joined by means of the short conductor 36 to the cathode 20 of the current limiting device, so that the current from the limiting device passes directly to the plate 33 of the audion.

The audion is provided with a grid 37 which is a helix of small wires wound about the double supporting wires or rods 38 and 39, such double form of rods being employed to secure the requisite spacing of the grid with reference to the cathode 22 of the audion. These double wires continue downwardly as a single wire 39 on opposite sides of the tube, and such supporting wires or rods are bent outwardly and then inwardly to space them from the plates 26 and 27 of the current limiting device and of the rectifier.

One end of the filament 16 is connected to the plate 27 of the rectifier by means of an arm or conductor 40 extending outwardly from the support 31 of such plate, as shown most clearly in Figure 1. The other end of the filament is connected to a terminal member 42 sealed in the bridge piece 4. A conductor 43 leads from this terminal portion outwardly to the prong of the tube, such prong being indicated in Figure 6 by the reference character 44. It is to be noted also from reference to Figures 1 and 6 that the conductor 43 is connected to the resistance 13 and to one side of the condenser 6, such points of connection being indicated in Figure 1 by the reference characters 45 and 46. A conductor 47′ leads from the grid support 39 outwardly to a second prong of the tube indicated by the reference character 47 in Figure 6. A conductor 48 leads outwardly from the cathode support 23 of the audion to the prong 49, indicated in Figure 6.

Figure 6:
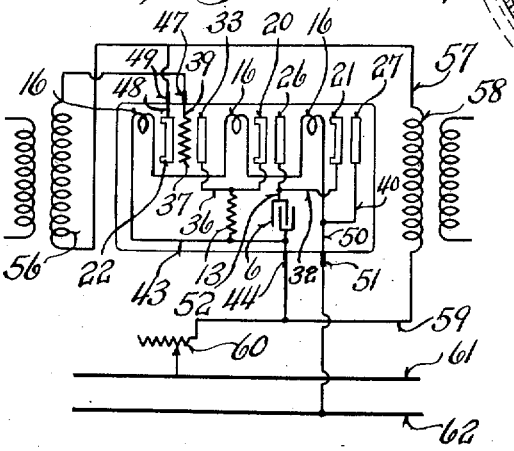
Figure 6 is a similar view of the system and wiring associated with a four-prong tube, such as that disclosed in Figure 1.

A conductor leads outwardly from the support 31 for the plate 27 of the rectifier and from one terminal of the filament, as indicated in Figures 1 and 6. Such conductor is numbered 50 and leads to the outgoing prong 51, as indicated in Figure 6.

It is to be noted from reference to Figure 1 that the cathode 21 of the rectifier is connected to the plate 26 of the current limiting device, and these members are connected, as shown in Figure 1, by means of the conductor 52 to the one side of the condenser 6. This connection is also diagrammatically indicated in Figure 6.

It is to be noted further that a conductor 53, as shown in Figure 1, leads to one side of the resistance block 13. This is diagrammatically indicated in Figure 6. However, in the actual construction of this resistance, a second conductor 54 is first soldered or otherwise secured to the upper end of the resistance 54, and the resistance is slipped into place. Thereafter, the conductor 53 is soldered or otherwise joined, as indicated at 55, to the lower end of the conductor 54. This mode of attachment which is followed throughout the construction of the tube, as is apparent from Figure 1, makes it possible to position the parts and finally to solder or otherwise secure the joints adjacent the bottom of the neck of the tube in a readily accessible position.

The tube, it will be seen, has four prongs, indicated in Figure 6 by the reference characters 44, 51, 47 and 49. It is, therefore, adapted for use in a four-prong socket with a vast simplification of the wiring of the set, as will be apparent from a consideration of Figure 6.

Referring to this figure, it will be seen that the grid 37 is connected by means of one of the prongs to one end of the input circuits, such for instance as one end of the secondary 56 of a transformer. The other end of the secondary is connected to the cathode 22 of the tube. Thus, differences of potential are induced by the radio or audio signals between the grid 37 and cathode 22 of the audion, and thus the control of current flow through the audion device is secured in response to the radio signal. The variation in current flow is transferred to other portions of the receiving set by means of the conductor 57 leading from the prong 49 of the cathode of the audion to one end of the primary 58 of a transformer. The other end of the primary 58 is connected to the conductor 59 which is connected through an adjustable resistance 60 to one of the mains 61. The other main 62 is connected to the prong 51 of the device, and thus supplies current to the plate 27 of the rectifier.

This current is alternating and the rectifier allows current to flow in one direction only, thus the current passing to the cathode 21 of the rectifying device and from thence to the anode 26 of the current limiting device from which it passes to the resistance 13 and from thence to the other main 61, as is apparent from Figure 6.

It is to be noted that the condenser 6 is interposed between the conductor 43 and the conductor 32, and thus stores up energy and supplies this energy during the period of non-rectification for the reverse half wave of the alternating current.

The current limiting device, chosen for illustration, acts as an impedance or resistance and thereby smooths out any pulsations and supplies a unidirectional unvarying current to the resistance 13. The plate 33 of the audion is attached to any portion of the resistance 13 in the initial formation of the tube, depending upon the voltage desired. In the form shown, it is attached to the end of the resistance. Thus, a constant voltage is impressed upon the audion plate 33, although initially the current was obtained from alternating current. Thus there is no hum whatsoever in this device, and no variation or pulsation due to variations in the supply mains. Consequently, the device is quiet in operation although energized from alternating current.

Figure 5:
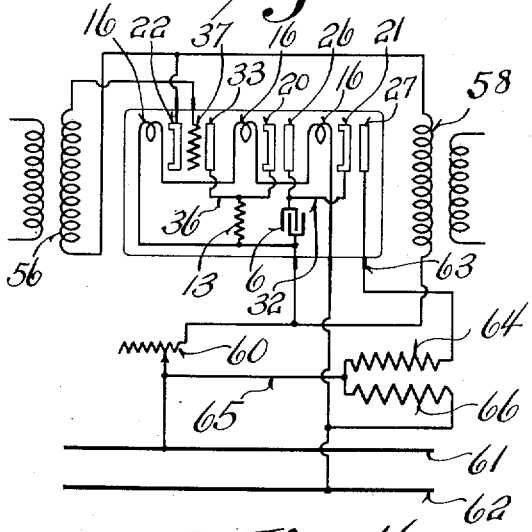
Figure 5 is a view of the wiring and of the system associated with one type of tube which is described in this case as a five-prong tube.
Figure 3:
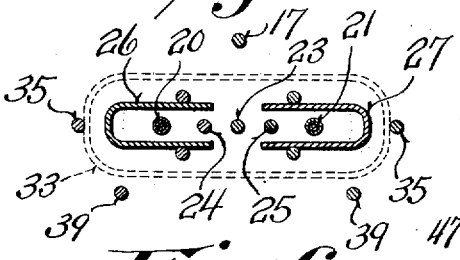
Figure 3 is a fragmentary sectional view on the line 3—3 of Figure 1.

Figure 5 illustrates an identically similar tube except for the fact that a prong 63 is provided for the plate 27 of the rectifier and the conductor 40 is dispensed with. The purpose of this fifth prong is to permit the impressing of a higher voltage upon the plate of the rectifier than that supplied by the mains 61 and 62. This is accomplished by connecting one end of the secondary 64 of a step-up transformer to the plate 27 of the rectifier. The other end of the secondary 64 is connected to the main 61 by means of the conductor 65. Also one end of the primary 66 of this step-up transformer is connected to the main 61. The other end is connected to the main 62.

It is to be noted that in both forms of the invention the variable resistance 60 is positioned within the filament circuit and thus controls the current supplied the filament and consequently the temperature of the filament. In addition to this, this resistance is positioned within the circuit leading from the primary 58 of the transformer for coupling the tube to the succeeding tube. Consequently, this resistance also varies the voltage impressed upon the plate of the audion so that in one control a simultaneous control of both the plate voltage and of the filament current is obtained.

It is to be particularly noted that the device is complete in itself and does not require auxiliary apparatus such as batteries or auxiliary rectifiers and devices of this type. It is a single entity and the tube carries within itself all of the necessary means for rectifying, for limiting the current, for supplying a constant voltage to the plate, and also contains a complete audion. Thus, it is a simple matter to connect the tube in a circuit, as shown either in Figure 5 or Figure 6, and to operate the tube directly from alternating current industrial supply mains.

Further, although the device is supplied from alternating current mains, nevertheless, as has been developed in detail above, there is no hum impressed upon the device, and consequently the device will be quiet in operation although, as stated, energized from commercial alternating current mains.

It is to be noted particularly from reference to Figures 1, 2, 3 and 4, that the tube is a highly practical device and lends itself readily to ordinary manufacturing process, so that no elaborate method need be evolved for the manufacture of this tube. This tube, therefore, may be made, as stated, by ordinary processes, and without an excessive expense, although it combines in itself a plurality of devices each cooperating and forming a unitary whole adapted for the novel use disclosed.

It is to be understood that the cathodes and plates of both the rectifier and of the current limiting device are mounted very close to each other, so that a minimum spacing and consequently a minimum drop in voltage occurs at each of these devices.

Further, it will be noted that the current limiting device arrives at the saturation point of its characteristic curve at a very low voltage.

It is to be noted that the plate of the rectifier and the plate of the current limiting device are mounted opposite each other and that the plate of the audion is mounted in axially spaced relation to the other two plates. Consequently there is no disturbing effect which would be present had the several plates surrounded each other.

It is obvious that the audion, or signal responsive means, may be used either as a detector or as an amplifier.

Although the invention has been described in considerable detail, such description is intended as illustrative rather than limiting as the invention may be variously embodied and as the scope of such invention is to be determined as claimed.

I claim:

1. A unitary electron discharge device including an evacuated vessel having a relatively large hollow neck, said device including an audion, a thermionic rectifier, and a thermionic current limiting device all mounted within the evacuated portion of said vessel, and a condenser cooperating with said rectifier and current limiting device and mounted within the hollow neck of said vessel.

2. A unitary electron discharge device including an evacuated vessel having a hollow neck, an audion, a thermionic rectifier, and a thermionic current limiting device, all of such devices being mounted within said evacuated vessel; said audion having a plate, an equipotential cathode, a grid interposed between said cathode and plate, and a filament for heating said cathode; said rectifier and current limiting device each having a plate and a heated cathode; a conductor located within said vessel and connecting the cathode of the rectifier with the plate of said current limiting device, a second conductor located within said vessel and connecting the cathode of said current limiting device with the plate of said audion; a condenser and a resistance located within the neck of the vessel and cooperating with the rectifier and current limiting device.

3. A unitary electron discharge device including an evacuated vessel, an audion, a thermionic rectifier, and a thermionic current limiting device, all of such devices being mounted within said evacuated vessel; said audion having a plate, an equipotential cathode, a grid interposed between said plate and cathode, and a filament for heating said cathode; said current limiting device and rectifier each having a plate, an equipotential cathode and a filament for heating said cathode; a conductor located within said vessel and connecting the cathode of said rectifier with the plate of said current limiting device, and a second conductor located within said vessel and connecting the cathode of said current limiting device with the plate of said audion, the plate of the rectifier and the plate of the current limiting device being mounted opposite each other, and the plate of the audion being mounted in axially spaced relation to the other two plates.

4. A unitary electron discharge device comprising a vessel having an evacuated portion and a permanently secured hollow base, an audion and a thermionic rectifier mounted within the evacuated portion of said vessel, said rectifier being designed for supplying current to said audion, a condenser cooperating with said rectifier to smooth out pulsations in the supplied current, and a resistance bridged around said audion, said condenser and said resistance being permanently mounted within the said hollow base, said audion and rectifier having heaters, and said base having external terminals connected to the audion and rectifier and to the heaters therefor, whereby said device constitutes a self-contained complete unit.

5. An electron discharge device comprising an envelope having an evacuated portion, a rectifier having an anode and a cathode, an audion having an anode, a cathode, and a grid, a heater for the cathode of said audion, one terminal of said heater being connected within said evacuated portion to the anode of said rectifier, said rectifier cathode supplying current to said audion anode, said rectifier and said audion being located within said evacuated portion, a condenser having one terminal connected to the other terminal of said heater and having its second terminal connected to the said rectifier, said condenser being enclosed by said envelope.

6. An electron discharge device comprising an evacuated vessel enclosing a rectifier and an audion, said rectifier having an anode and a cathode, and said audion having an anode, a cathode, and a grid, a heater for the cathode of said rectifier and the cathode of said audion, said vessel having a conductor leading outwardly therefrom and connected to the anode of said rectifier and one terminal of said heater, and having a second conductor leading therefrom connected to the other terminal of said heater, and having a third conductor leading therefrom and connected to the cathode of said audion and having a fourth conductor leading therefrom and connected to said grid, and means for smoothing out the pulsations of current from said rectifier.

7. A unitary electron discharge device including an evacuated vessel having a relatively large hollow neck, said device including an audion, a thermionic rectifier and a current limiting device all mounted within the evacuated portion of said vessel, a condenser cooperating with said rectifier and current limiting device and a resistance bridged around said audion, both condenser and resistance located within the neck of the vessel, and a base surrounding and permanently secured to said hollow neck of the vessel and having prongs extending from said base for connecting the various elements of said device.

8. A unitary electron discharge device including an evacuated vessel having a relatively large hollow neck, said device including an audion, a thermionic rectifier and a current limiting device all mounted within the evacuated portion of said vessel, a condenser cooperating with said rectifier and current limiting device and a resistance bridged around said audion, both condenser and resistance located within the neck of the vessel, and a base surrounding and permanently secured to said hollow neck of the vessel and having prongs extending from said base for connecting the various elements of said device, one of said prongs being connected to the grid of the audion, a second prong being connected to the cathode of said audion, a third of said prongs being connected to the plate of said rectifier and to one terminal of said heater and a fourth of said prongs being a lead-in conductor for both the said heater current and for said audion plate current and connected to the other end of said heater.

9. An electron discharge device comprising an evacuated vessel enclosing an audion having a plate, an equipotential cathode, and an interposed grid, and enclosing a rectifier having a plate and a cathode, heating means for said equipotential cathode of the audion electrically distinct and separate from said equipotential cathode of said audion, said rectifier supplying current to said audion, and means for smoothing out pulsations in the rectified current, said heating means having only a single duty of heating said cathode of the audion, and said cathode of the audion having only a single duty of emitting electrons.

10. An electron discharge device comprising an evacuated vessel enclosing a rectifier and an audion, said rectifier having an anode and a cathode, and said audion having an anode, a cathode, and a grid, a heater for the cathode of said audion, said vessel having a conductor leading outwardly therefrom and connected to the anode of said rectifier and one terminal of said heater, and having a second conductor leading therefrom connected to the other terminal of said heater, and having a third conductor leading therefrom and connected to the cathode of said audion, and having a fourth conductor leading therefrom and connected to said grid, and means for smoothing out the pulsations of current from said rectifier.

11. A unitary electron discharge device comprising an envelope having an evacuated portion, a rectifier and an audion each having an anode and a cathode, said audion also having a grid, a heater for the cathode of said audion, said rectifier being designed for supplying current to said audion anode, said rectifier and said audion being located within said evacuated portion, smoothing means having a condenser, said smoothing means being connected to said rectifier, said smoothing means and rectifier being connected across said heater, said condenser being enclosed by said envelope.

12. An electron discharge device comprising a vessel, a rectifier and an audion, each having an anode and a cathode and both being enclosed within said vessel, said audion having also a grid, and connecting means between said rectifier and said audion anode through which said rectifier supplies current to said audion anode, said means being enclosed within said vessel.

13. An electron discharge device comprising an envelope, a rectifier having electrodes, an audion having an anode, a cathode, and an interposed grid, said rectifier and said audion being enclosed within said envelope, a heater for the cathode of said audion, and connecting means between at least one of said rectifier electrodes and at least one end of said heater, said means being enclosed within said envelope.

14. An electron discharge device comprising a vessel, signal responsive means enclosed within said vessel and having an electron-emitting cathode, an anode designed to receive electrons from said cathode, and a control electrode for controlling the space current between said cathode and said anode, and rectifying means enclosed within said vessel for rectifying alternating current and for supplying said signal responsive means, and having an anode and a cathode, the anode of said rectifying means being mechanically separate and distinct from the cathode of said signal responsive means.

15. An electron discharge device comprising a vessel, signal responsive means enclosed within said vessel and having an electron-emitting cathode, an anode and a control electrode interposed between said anode and said cathode, and rectifying means enclosed within said vessel for rectifying alternating current and for supplying said signal responsive means, and having an indirectly heated cathode provided with heating means and an anode.

16. An electron discharge device comprising a vessel, a rectifier, and an audion enclosed within said vessel, said rectifier having an anode and an indirectly heated cathode and being designed for supplying said audion, said audion having an electron-emitting cathode, an anode designed to receive electrons from the cathode of said audion, and a grid interposed between the anode and cathode of said audion, heating means for the cathode of said rectifier, and means for smoothing out pulsations in the rectified current.

17. An electron discharge device comprising a vessel, a rectifier and an audion enclosed within said vessel, said rectifier having an anode and a cathode and being designed for supplying said audion, said audion having an electron-emitting cathode, an anode and an interposed grid, the anode of said rectifier being located outside the anode of said audion, said audion anode being located outside said audion cathode.

18. An electron discharge device comprising a vessel, a rectifier and an audion enclosed within said vessel, said rectifier having an anode and a cathode and being designed for supplying said audion, said audion having an anode and an electron-emitting cathode separate from said rectifier anode and having also an interposed grid, the anode of said rectifier and the anode of said audion having their individual axes lying in substantially the same plane, said audion anode being located outside said audion cathode.

19. An electron discharge device comprising an envelope having two separate compartments, a rectifier and an audion enclosed within one of said compartments, smoothing means for smoothing out pulsations in the rectified current located within the other of said compartments, said rectifier having an anode and an indirectly heated cathode and being designed for supplying said audion, said audion having a cathode, an anode, and an interposed grid, and heating means for the cathode of said rectifier.

20. An electron discharge device comprising an envelope having two separate compartments, rectifying means and signal responsive means enclosed within one of said compartments, smoothing means for smoothing out pulsations in the rectified current located within the other of said compartments, said rectifying means having a cathode and an anode and being designed for supplying said signal responsive means, said signal responsive means having a cathode, an anode and an interposed grid, the compartment enclosing said rectifying means and said signal responsive means being hermetically sealed.

21. An electron discharge device comprising an envelope having two separate compartments, at least one of said compartments constituting an air-tight vessel, means within said vessel for rectifying and for amplifying, smoothing means located within the other of said compartments, said smoothing means cooperating with said last mentioned means and being designed to smooth out pulsations in the rectified current.

22. An electron discharge device comprising an hermetically sealed vessel, rectifying and signal responsive means, both enclosed within said vessel, said rectifying means being designed to supply said signal responsive means, said device having an auxiliary compartment forming with said vessel an auxiliary structure, and smoothing means located within said auxiliary compartment for smoothing out pulsations in the rectified current.

23. An electron discharge device comprising a vessel having two compartments, rectifying means and signal responsive means, both enclosed within one of said compartments, smoothing means located within the other of said compartments and designed to smooth out pulsations in the rectified current, said rectifying means having an anode and a cathode, and being designed to supply said signal responsive means, said signal responsive means having a cathode provided with heating means, an anode, and an interposed grid, and an electrical circuit including a source of alternating current, said circuit having a connection with said heating means and having a connection with the anode of said rectifying means.

24. An electron discharge device comprising an airtight vessel, rectifying means and signal responsive means enclosed within said vessel, said rectifying means having an anode and a cathode and being designed to supply said signal responsive means, said signal responsive means having a cathode provided with heating means, an anode and an interposed grid, a second vessel forming with said first vessel a unitary structure, smoothing means enclosed within said second vessel for smoothing out pulsations in the rectified current, and an electrical circuit including an alternating current source, said circuit having a connection with said heating means and having a connection with the anode of said rectifying means, said alternating current source being the sole source of current supply for said circuit.

25. An electron discharge device comprising a vessel, rectifying means, and signal responsive means enclosed within said vessel, and smoothing means mechanically forming with said vessel a unitary structure, a source of alternating current for supplying said device, and means connecting said source to said device whereby a substantially constant direct current is supplied to said signal responsive means through said rectifying and smoothing means from said alternating current source.

26. An electron discharge device comprising signal responsive means and rectifying means, both said means forming a unitary apparatus, said signal responsive means having a cathode, an anode, and a control electrode, and said rectifying means having a cathode and an anode distinct and separate from the cathode of said signal responsive means, a source of alternating current for supplying said device, and means for connecting said source to said device, whereby a rectified potential is supplied to the anode of said signal responsive means through said rectifying means from said alternating current source.

27. An electron discharge device comprising a vessel, signal responsive means and rectifying means enclosed within said vessel, said signal responsive means having an electron-emitting cathode, an anode, and an interposed control electrode, said rectifying means having a cathode and an anode and being designed for supplying rectified potential to the anode of said signal responsive means, the anode of said rectifying means being mechanically distinct and separate from the cathode of said signal responsive means, and an electrical circuit including a source of alternating current connected between the anode and the cathode of said rectifying means, said alternating current source being connected to the anode and to the cathode of said signal responsive means.

In testimony that I claim the foregoing I have hereunto set my hand at Milwaukee, in the county of Milwaukee and State of Wisconsin.

ARISTOTE MAVROGENIS.